May 12, 1970  B. I. KJELLBERG  3,511,970
VAPOR ACTUATED SAFETY THERMOSTAT
Filed Nov. 14, 1966
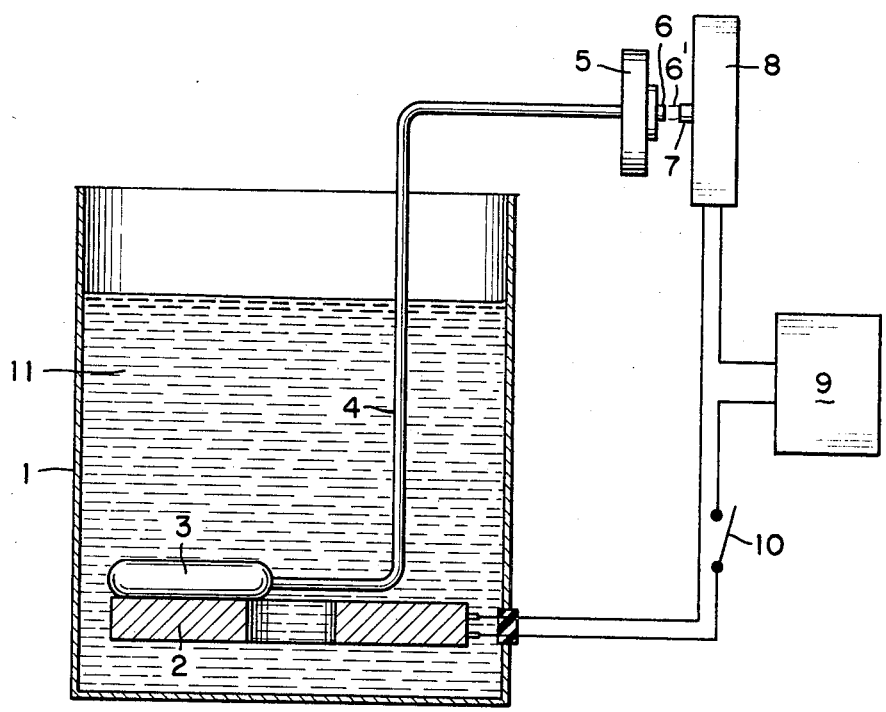
INVENTOR
BURRE I. KJELLBERG
BY
ATTORNEY 3,511,970
VAPOR ACTUATED SAFETY THERMOSTAT
Burre I. Kjellberg, Ballwin, Mo., assignor to Diatemp, Inc., St. Louis, Mo., a corporation of Missouri
Filed Nov. 14, 1966, Ser. No. 593,849
Int. Cl. H05b 3/02; A47j 31/00
U.S. Cl. 219—331                             2 Claims

ABSTRACT OF THE DISCLOSURE

A fast-acting vapor-actuated temperature control for a coffee maker operating in a narrow temperature range between 205 and 208 degrees Fahrenheit, having a single hydraulic bulb in contact with the heater element to serve two purposes, first to regulate and maintain the temperature of the coffee in that narrow range just below the boiling point of coffee, and second to serve as a high-limit safety switch instantaneously cutting off the power supply to the heater element in case of a boil-over or accident.

---

My invention consists in a new result obtained from rearranging the configuration of elements in a common solution to a large class of problems. This class of problems arises out of the use of water being heated to a point very close to the boiling point, which is 212 degrees on the Fahrenheit scale.

Many widely used devices attempt to control the temperature of water just at, or slightly above or slightly below the boiling point of the water. Among such devices are the typical steam tables which are used in restaurants to maintain food warm for relatively long periods of time; sterilizers which use boiling water or steam and which are widely used by hospitals, as well as individual doctors and dentists; veterinarians and nurses. Another wide use for such thermostat control is in the common vending machines which dispense coffee, soup or tea. All of these require close control of the temperature and the temperature is maintained very close to the boiling point of water, which acts either as the heat-transfer medium in the steam tables and sterilizers, and as part of the consumer product in the case of coffee-makers and the like.

There are several difficulties. If the temperature control actuates too low, the water never reaches the temperature desired and steam table food is lukewarm and unappetizing, a low operating sterilizer will not sterilize at a low temperature. Similarly a coffee-maker will produce lukewarm coffee, unsatisfactory to the customer.

Contrariwise if the thermostat control actuates at a point above the boiling point of water, the water can all be boiled out as steam. The operators of the steam tables, sterilizers and coffee-makers will not be warned in time and a valuable heating element will be burned out. The time of replacement and the delays involved in replacing such a burned out heating element may and often do prove more expensive and inconvenient than the mere cost of the replaced element. However my invention solves all of these problems in a unique way.

One of the principal advantages of my invention is that it uses a rapid acting configuration having a response time so short that the heating element or elements involved cannot be burned out. At the same time it provides extremely accurate control of temperature around the boiling point of the liquid being used, in this case water. It is of course understood that the elements and configuration will apply to other situations than the boiling of water and this will be developed as I proceed.

Another advantage is that the "differential," that is the number of degrees of temperature which exists between the heated fluid and the thermostat sensor, is lessened in the case of my invention. This is a direct result of my configuration an my choice of elements.

The above advantages and many others will be quite apparent to those skilled in the art from a study of the following description taken in adjunct with the accompanying drawing which is a typical representation of my invention, showing all of the significant and salient features.

For the illustration of my invention I have chosen a coffee-maker. The reason I have chosen to illustrate the coffee-maker is that the manufacturers prefer to maintain the coffee dispensed from vending machines at a controlled temperature between 205 and 208 degrees Fahrenheit. The reasons for this are principally custom. The public has come to consider coffee dispensed in this temperature range as the best from a taste viewpoint, as well as being easily cooled. Also, if the temperature never rises above 208 degrees, no steam will boil off, to cause damage to the heater elements as described above.

The drawing illustrates a side elevation of the invention, partly in cross-section and partly schematic.

In the drawing, numeral 1 is given to the tank representing the coffee-maker body which contains the water and the other elements. The heater element, shown partially in cross section is given the numeral 2.

For my control element I use a Diastat, such as is shown in Pat. No. 2,307,636 granted to R. E. Newell on Jan. 5, 1943. I could just as well however use the diaphragm device shown in the Pat. No. 2,607,533 granted to R. C. Main on Aug. 19, 1952.

My Diastat consists of a bulb 3 of metal, connected by the metal tube 4 to the nested pair of corrugated diaphragms shown as 5. The diaphragms are provided at their center with a stud 6, which projects against the actuating lever 7 of the microswitch 8.

Microswitch 8 controls the power supply from the power source 9, usually a wall socket, to the heater element 2.

It will be noted that my bulb 3 lies in intimate contact with the heater element 2. This is most important and leads to several inventive results which distinguish this configuration from the previous art. I fill my bulb 3, tube 4 and diaphragms 5 with methyl alcohol in the liquid form and seal them off when completely full. In other experiments I have used ethyl alcohol, a variety of organic liquids and even nitrogen. It is simply a matter of choosing the correct liquid for the temperature range involved. The amount of movement of the stud 6, which is required to actuate the actuating lever 7 of the microswitch, is the determining factor when taken in conjunction with the boiloff temperature of the liquid in the tank. Methyl alcohol or methanol boils below the boiling point of water, in fact it boils at some 149 degrees Fahrenheit. This is a critically important factor in my choice of sensor or transducer fluid for this application. That is in controlling the temperature of the water or other fluid, at or near the boiling point of that fluid, the sensor fluid or transducer fluid must have a lower boiling point, so that it has a vapor phase in existence at the control point desired.

In operation, I begin with the stud 6 of the diaphragm in its retracted position at 6. The diaphragms 5, as is well known in the art, lie in close nested position. The manual switch in the electrical circuit is closed and power flows from the power source, since the manual switch 10 is closed, through the wires to the heater element 2.

As power passes into the heater element, the temperature of it, that is heater element 2 and the water or coffee 11, in the tank 1 rises. The sensor fluid in the bulb 3, tube 4 and the diaphragms 5 also receives heat and its temperature rises. As the temperature of the sensor fluid rises, the sensor fluid vaporizes, pushing the nested diaphragms 5 apart by the vapor pressure therein rising, and finally the rise in temperature with its consequent increase in pressure is sufficient to move the stud 6 to the position 6'.

At the position 6', the stud 6 will have pressed against and moved the actuating lever 7 of the microswitch sufficiently far enough to cut off the supply of power from the power supply 9 to the heater element 2.

With the power cut off, the heater will cool down, the liquid 11 will cool down, and consequently the sensor fluid and sensor vapor, which is also the transducer fluid and transducer vapor, in the bulb 3, the tube 4 and the diaphragms will contract. Thus the diaphragms will contract toward their original position and the stud 6 will move away from the position 6' back toward the position at 6. As this happens the actuating lever 7 of the microswitch 8 will move outward and within a period of time the actuating lever will reach the point at which the microswitch contacts will again be closed, and power will again flow from the power supply or power source 9 to the heater element 2, and the cycle will begin over. It will be remembered that if the liquid be coffee, its level will constantly be changing, and this will only affect the cooling rate of the tank and its assembly, which in turn will affect the rate of cycling the power on and off.

My invention consists however of both a control thermostat which is vapor actuated, and a high limit switching arrangement which protects the heater. For let us assume that for one reason or another the liquid, coffee would come to a level below that of the heater element. There is naturally some boiloff in a coffee maker operating at 208 degrees Fahrenheit, since the boiling point of the water has been lowered by the addition of the coffee. Let us assume that the device has been left completely unattended or that one responsible has failed to add any liquid and that the power is on. The inevitable result with the present coffee-makers in the art is that either a second switch must be provided to act as a high limit safety switch, or that the heater element will burn out.

With my invention, the intimate contact of the sensor fluid and vapor through the conducting metal wall of the bulb 3, with the heater element 2, will cause the sensor and transducer fluid to vaporize in a few seconds. The vapor created in those few seconds thus by the powerful heater elements 2 employed, will immediately begin moving the stud 6 to the 6' position to actuate the actuating lever 7, to cut off the power supply from the power source 9, by opening the microswitch contacts.

There are thus two principal objects attained simultaneously by my construction. First there is the function of controlling the heating element when there is liquid in the tank. Second however there is the function of protecting the heating element from burning out if someone forgets to fill the tank or if it boils out all of the liquid.

The differential has been narrowed for a typical instance from a number of reasons. I have designed a coffee-maker using these principles of construction, in which the temperature of the liquid does not drop below 205 degrees and does not rise above 208 degrees. One of the principal contributing factors is that there is an "anticipation" effect brought about by the close contact between the bulb 3 and the heater element 2. This anticipation is an effect which I discovered to be due to the following reason. Around the element which does the heating the degree rise in temperature is much higher than in the water or liquid farther away from the heater element.

Another factor which I have discovered is an advantage of my construction, is the following. With coffee maker of this type, one operates so close to the boiling point that around the heater element 2 tiny bubbles are constantly formed. These bubbles are hotter than the liquid or coffee, and this extra rise in heat production or heat transfer acts to provide the device with extra increase of vapor pressure in the diaphragms 5, thereby producing extra movement, and thus making the stud 6 move more quickly to the position 6'.

As the machine grows older, the switching contacts in the microswitch 8 may become a little slower because of the building up of contact resistance. We must remember that there is constant cycling of the switch contacts on and off, to maintain the three degree differential between 205 and 208. When the contact resistance has built up, the high limit action is more important, to prevent the burning up of the heater element 2.

The rapid formation of the sensor vapor in the diaphragms when the tank is dry is quite striking. Due to the the immediate and intimate contact of the sensor liquid through the wall of the bulb 3, the sensor or transducer vapor forms in a matter of seconds and this immediately actuates the microswitch, through the movement of the stud 6 to the position 6', to force the actuating lever 7 to cut the power off, breaking the circuit to the heater element.

It will be understood of course that what I have illustrated is merely an example in the form of a coffee-maker. The same principles of construction however apply equally well to sterilizers, steam tables and any other devices which require narrow regulation and control of a liquid, together with a fast-acting high limit switch. I have provided both functions in the same construction with a minimum of elements. Many variations, modifications and changes may of course be made without departing from the spirit of the invention.

What I claim is:

1. In a thermostat control to maintain coffee near its boiling point, and provided with a coffee-holding tank, a power source, and a heater element heated by said power source,
   a sensor fluid-filled bulb in intimate contact with said heater element;
   a tube connected to said bulb;
   an expansible element in the form of a pair of diaphragms connected to said tube and said bulb;
   a sensor fluid in said bulb, tube and expansible element having a lower boiling point than that of said coffee in said tank; said sensor fluid having a vapor phase in operation in the control range between 205 and 208 degrees Fahrenheit; and
   a microswitch actuated by said diaphragms to control the supply of power from said power source to said heater element.

2. The device described in claim 1 and further characterized by the sensor vapor in said bulb, tube and diaphragms rapidly generating control actuation to cut off the power supply when the fluid held in the said tank does not cover the heater element.

References Cited

UNITED STATES PATENTS

| | | |
|---|---|---|
| 574,537 | 1/1897 | Hadaway. |
| 1,930,551 | 10/1933 | Blashfield _____ 219—331 |
| 2,307,636 | 7/1943 | Newell _____ 236—99 X |
| 2,607,533 | 8/1952 | Main _____ 236—99 |
| 2,880,300 | 3/1959 | Reimers et al. _____ 219—331 X |
| 2,902,581 | 9/1959 | Stiebel _____ 219—332 X |
| 3,132,518 | 5/1964 | Salmon. |
| 3,134,008 | 5/1964 | Finn _____ 219—513 X |

FOREIGN PATENTS 631,502  1/1962  Italy.

ANTHONY BARTIS, Primary Examiner

U.S. Cl. X.R.

99—281; 219—513; 236—99